(12) United States Patent
Balsells

(10) Patent No.: US 8,196,271 B2
(45) Date of Patent: Jun. 12, 2012

(54) APPARATUS INCLUDING A PIN CONNECTOR FOR SECURING A FIRST MEMBER AND A SECOND MEMBER TO ONE ANOTHER, AND ASSOCIATED METHODS

(75) Inventor: Pete Balsells, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 402 days.

(21) Appl. No.: 12/559,227

(22) Filed: Sep. 14, 2009

(65) Prior Publication Data

US 2010/0064490 A1  Mar. 18, 2010

Related U.S. Application Data

(60) Provisional application No. 61/097,076, filed on Sep. 15, 2008.

(51) Int. Cl.
*F16B 21/07* (2006.01)
(52) U.S. Cl. .............. 24/453; 24/581.1; 24/676; 29/453
(58) Field of Classification Search .................. 24/671, 24/673, 674, 676, 297, 453, 662, 705, 581.1, 24/458, 108, 675; 403/326, 327, 408.1, 161; 411/347, 352, 353, 516, 517; 29/453
See application file for complete search history.

(56) References Cited

U.S. PATENT DOCUMENTS

| | | | | |
|---|---|---|---|---|
| 829,837 A | * | 8/1906 | Brisacher | 24/453 |
| 2,062,057 A | * | 11/1936 | Hobby | 40/202 |
| 3,494,244 A | * | 2/1970 | Wayland | 411/510 |
| 3,551,963 A | * | 1/1971 | Mosher, Jr. et al. | 24/618 |
| 3,890,680 A | * | 6/1975 | Furuya | 24/614 |
| 3,910,566 A | | 10/1975 | Pedersen et al. | |
| 4,777,705 A | * | 10/1988 | Ingram | 24/453 |
| 4,804,290 A | | 2/1989 | Balsells | |
| 4,847,959 A | * | 7/1989 | Shimada et al. | 24/671 |
| 5,545,842 A | * | 8/1996 | Balsells | 174/372 |

(Continued)

FOREIGN PATENT DOCUMENTS

WO   WO 03/046392 A2   6/2003

OTHER PUBLICATIONS

International Search Report completed Apr. 19, 2010 and mailed Apr. 20, 2010 from corresponding International Application No. PCT/US2009/056682, filed Sep. 11, 2009 (3 pages).
Written Opinion completed Apr. 19, 2010 and mailed Apr. 20, 2010 from corresponding International Application No. PCT/US2009/056682, filed Sep. 11, 2009 (4 pages).

*Primary Examiner* — James Brittain
(74) *Attorney, Agent, or Firm* — Klein, O'Neill & Singh, LLP

(57) ABSTRACT

Embodiments of the present apparatus are configured to secure a first member and a second member to one another. The first and second members include a bore extending through at least one of the first and second members and at least partially through the other of the first and second members. The apparatus comprises a pin connector including an enlarged ball portion positioned along a shank. The first member includes an annular groove extending around the bore. A canted coil spring seats within the groove. The apparatus is configured such that the spring exerts a squeezing force on the ball portion when the pin connector is disposed within the bore and the head of the pin connector contacts the second member.

20 Claims, 5 Drawing Sheets

U.S. PATENT DOCUMENTS 5,580,204 A * 12/1996 Hultman .................. 411/509
6,324,731 B1 * 12/2001 Pliml, Jr. .................. 24/453
2004/0245686 A1 * 12/2004 Balsells .................. 267/1.5
2006/0228166 A1 * 10/2006 Balsells .................. 403/57

* cited by examiner

APPARATUS INCLUDING A PIN CONNECTOR FOR SECURING A FIRST MEMBER AND A SECOND MEMBER TO ONE ANOTHER, AND ASSOCIATED METHODS

CROSS-REFERENCE TO RELATED APPLICATION

This is a regular utility application of provisional application No. 61/097,076, filed Sep. 15, 2008, the contents of which are expressly incorporated herein by reference for all purposes.

FIELD OF ART

The present invention relates to connectors for securing objects together.

DESCRIPTION OF RELATED ART

Male threaded fasteners, such as screws and bolts are commonly used to secure objects together. One advantage of threaded fasteners is that they can tolerate variations in thickness in one or both of the objects to be secured together. The threaded member can be advanced into a threaded hole in one of the objects, or in a nut, until the desired tension is achieved.

One disadvantage of threaded fasteners is that advancing a male threaded member into a female threaded hole (and withdrawing it therefrom) requires a relative twisting of the threaded members. This twisting is time consuming and can be difficult to perform in hard to reach places. The time factor becomes severely limiting in applications where a large number of fasteners must be removed in order to disassemble objects, and/or where the fasteners must be frequently removed and replaced. In such applications, molded pins or latching hooks can save time. However, these components are generally not able to tolerate any variations in thickness.

SUMMARY

The preferred embodiments of the present apparatus and methods for securing a first member and a second member to one another have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include reliable securement of members, and the capacity to quickly connect and disconnect members.

One embodiment of the present apparatus is configured for securing a first member and a second member to one another. The first and second members include a bore extending through at least one of the first and second members and at least partially through the other of the first and second members. The apparatus comprises a pin connector including a head portion having a first diameter. The pin connector further includes an elongate, unthreaded shank extending from the head portion. The shank has at least a first portion with a second diameter that is less than the first diameter. The pin connector further includes an enlarged ball portion positioned along the shank. The ball portion is shaped substantially as a double-truncated sphere and has a third diameter that is less than the first diameter but greater than the second diameter. The apparatus further comprises an annular groove in the first member. The annular groove extends around the bore. A canted coil spring is disposed within the groove. The apparatus is configured such that the spring exerts a squeezing force on the ball portion when the pin connector is disposed within the bore and the head of the pin connector contacts the second member.

BRIEF DESCRIPTION OF THE DRAWINGS

The preferred embodiments of the present apparatus and methods for securing a first member and a second member to one another will now be discussed in detail with an emphasis on highlighting the advantageous features. These embodiments depict the novel and non-obvious apparatus shown in the accompanying drawings, which are for illustrative purposes only. These drawings include the following figures, in which like numerals indicate like parts.

DETAILED DESCRIPTION OF THE PREFERRED EMBODIMENTS

Figure 1:
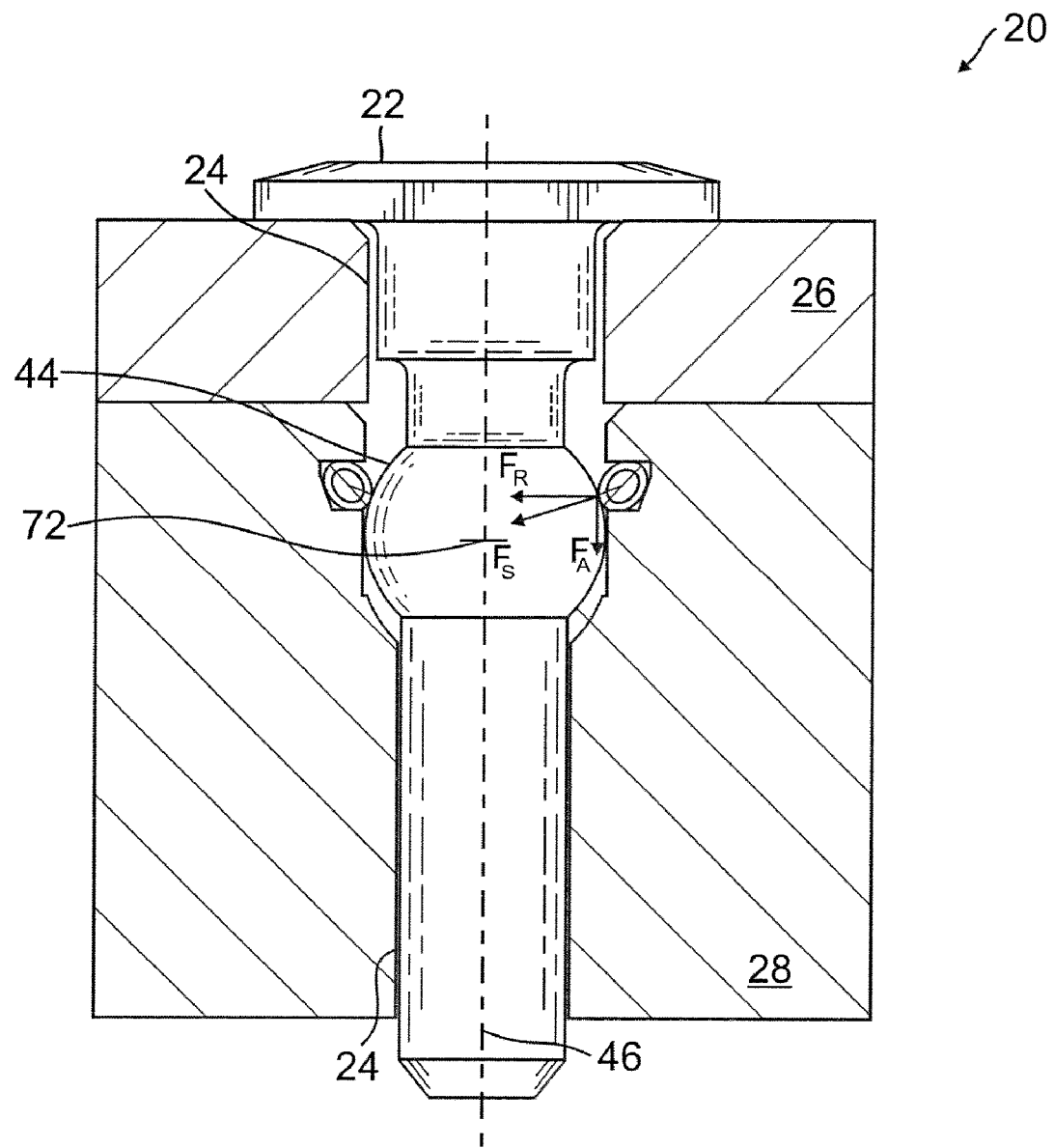
FIG. 1 is a partial cross-sectional side view of one embodiment of the present apparatus.

In the detailed description that follows, the present embodiments are described with reference to the drawings. In the drawings, elements of the present embodiments are labeled with reference numbers. These reference numbers are reproduced below in connection with the discussion of the corresponding drawing features.

The illustrated embodiments of the present quick connect/disconnect pin connector 22 and associated methods discussed herein include canted coil springs. In certain embodiments, the coil springs may be radially canted, while in certain other embodiments the coil springs may be axially canted. In still further embodiments, the coil springs may be both radially canted and axially canted. Canted coil springs are described in detail in U.S. Pat. Nos. 4,655,462; 4,826,144; 4,876,781; 4,907,788; 4,915,366; 4,964,204; 5,139,243; 5,160,122; 5,503,375; 5,615,870; 5,709,371; 5,791,638; and 7,055,812. The contents of each of the foregoing patents are hereby expressly incorporated by reference herein.

Figure 2:
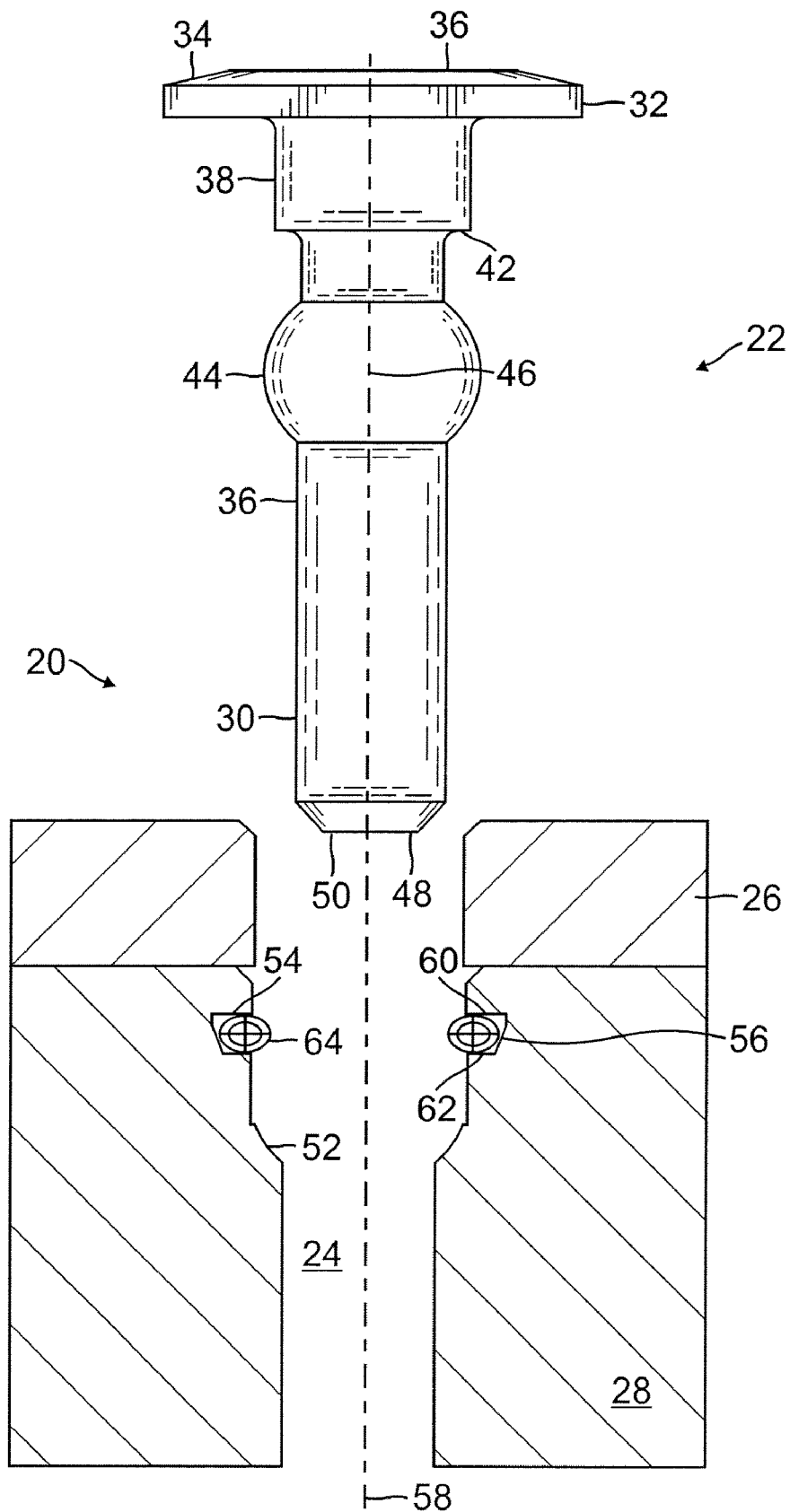
FIG. 2 is a partially exploded view of the apparatus of FIG. 1.

FIGS. 1 and 2 illustrate partial cross-sectional views of one embodiment of the present apparatus 20 including a quick connect/disconnect pin connector 22. The pin connector 22 is disposed in a bore 24 (FIG. 2) extending through a first member 26 and a second member 28. In the illustrated embodiment, the first member 26, also referred to herein as a plate 26, has a thickness substantially less than the thickness of the second member 28, also referred to herein as a housing 28. However, those of ordinary skill in the art will appreciate that the relative dimensions shown in FIG. 1 are not limiting. Further, the pin connector 22 is described herein with reference to the plate 26, housing 28 and bore 24 shown in FIG. 1. However, those of ordinary skill in the art will appreciate that embodiments of the present apparatus 20 are adapted for use in other fastening applications, such as for fastening toys, furniture, car parts, etc.

With reference to FIG. 2, the pin connector 22 includes an elongate shank 30 extending from a head portion 32. In the illustrated embodiment, the head portion 32 is shaped substantially as a disk, and includes a chamfer 34 about an outer edge of a proximal surface 36. Those of ordinary skill in the art will appreciate that the head portion 32 may have substantially any shape, and may, for example, include features that facilitate engagement of the head portion 32 with one or more tools for inserting/withdrawing the pin connector 22 relative to the bore 24.

The shank 30 is preferably unthreaded, and includes a proximal portion 38 having a first diameter and a distal portion 40 having a second, smaller diameter. The proximal and distal portions 38, 40 meet at a distally facing shoulder 42. An enlarged ball portion 44 interrupts the shank distal portion 40 and is spaced from the shoulder 42. The ball portion 44 is shaped substantially as a double-truncated sphere. A center of the sphere lies on the longitudinal axis 46 of the shank 30, such that the ball portion 44 protrudes evenly from all sides of the shank 30.

A distal end 48 of the shank 30 includes a chamfer 50. The chamfer 50 guides the shank 30 into the bore 24 during the insertion process. Those of ordinary skill in the art will appreciate, however, that some embodiments of the present pin connector 22 may not include a chamfer at the distal end.

With continued reference to FIG. 2, the bore 24 in the housing 28 includes a proximally facing shoulder 52. The relative dimensions of the ball portion 44 and the shoulder 52 are configured such that the shoulder 52 limits the advancement of the pin connector 22 into the bore 24 when the ball portion abuts the shoulder. In the illustrated embodiment, the shoulder 52 includes a radiused surface, which may in certain embodiments be matched with the radius of the ball portion 44. Those of ordinary skill in the art will appreciate that the shoulder 52 may have other configurations, and that in certain embodiments the shoulder 52 may be absent.

The bore 24 in the housing 28 further includes an annular groove 54 positioned proximally of the shoulder 52. A bottom 56 of the groove 54 is nonparallel with respect to the bore longitudinal axis 58. A depth of the groove 54 (measured in a direction perpendicular to the bore longitudinal axis 58) is greater at a proximal side 60 of the groove 54 than at a distal side 62 of the groove 54. The groove bottom 56 thus tapers outwardly in a distal-to-proximal direction. The advantages achieved by the "taper bottom" groove 54 are described below. Those of ordinary skill in the art will appreciate that in other embodiments the groove 54 could have other configurations, such as a non-tapering bottom or flat.

A ring-shaped, canted coil spring 64, which may or may not be connected at its ends, seats within the groove 54. The relative dimensions of the spring 64 and groove 54 are chosen to meet the requirements of the application, as described in further detail below. In general, however, a width of the spring's coils is greater than the average depth of the groove 54 so that the coils protrude into the bore 24 when the pin connector 22 is not disposed within the bore 24. Further, the ball portion 44 has a diameter that is closely matched to, but smaller than, the diameter of the bore 24 above the shoulder 52. Thus, in order to advance the pin connector 22 into the bore 24, or to withdraw the pin connector 22 from the bore 24, the ball portion 44 must displace the spring 64 as the ball portion 44 passes the spring 64. The processes of inserting and withdrawing the pin connector 22 are illustrated in FIGS. 3-6. These figures include dimensions, which reflect test observations. The principles of operation for the present apparatus 20 apply across a broad spectrum of configurations and dimensions. Accordingly, the dimensions provided in FIGS. 3-6 should not be interpreted as limiting.

As those of ordinary skill in the art will appreciate, each coil in a canted coil spring is elliptical, and thus includes a major axis and a minor axis. The coils may elastically deform by compressing along their minor axes. However, compression along a coil's major axis causes plastic deformation. In certain embodiments of the present apparatus 20, it is desired to ensure that the spring 64 does not plastically deform. Thus, as used herein, the terms deflection and compression as applied to the spring 64 refer to compression of the spring 64 along its coils' minor axes.

Figure 3:
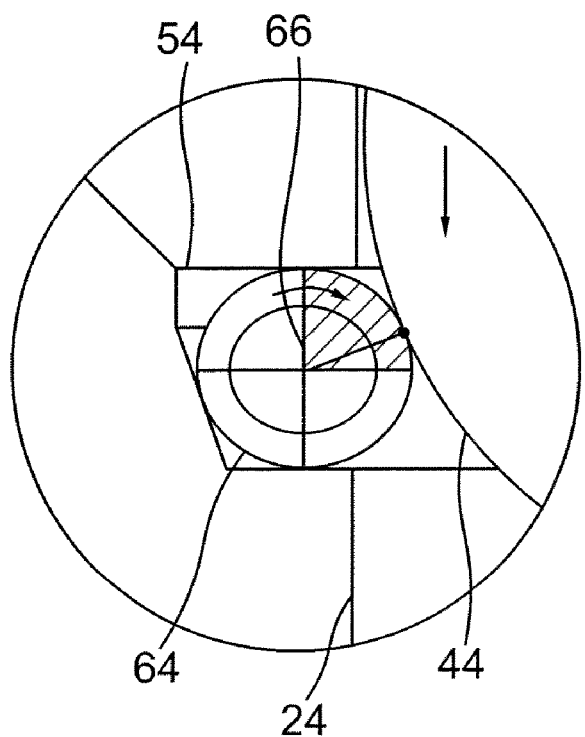
FIG. 3 is a detail view of the groove, spring and ball portion of the apparatus of FIG. 1 at a first insertion step.
Figure 7:
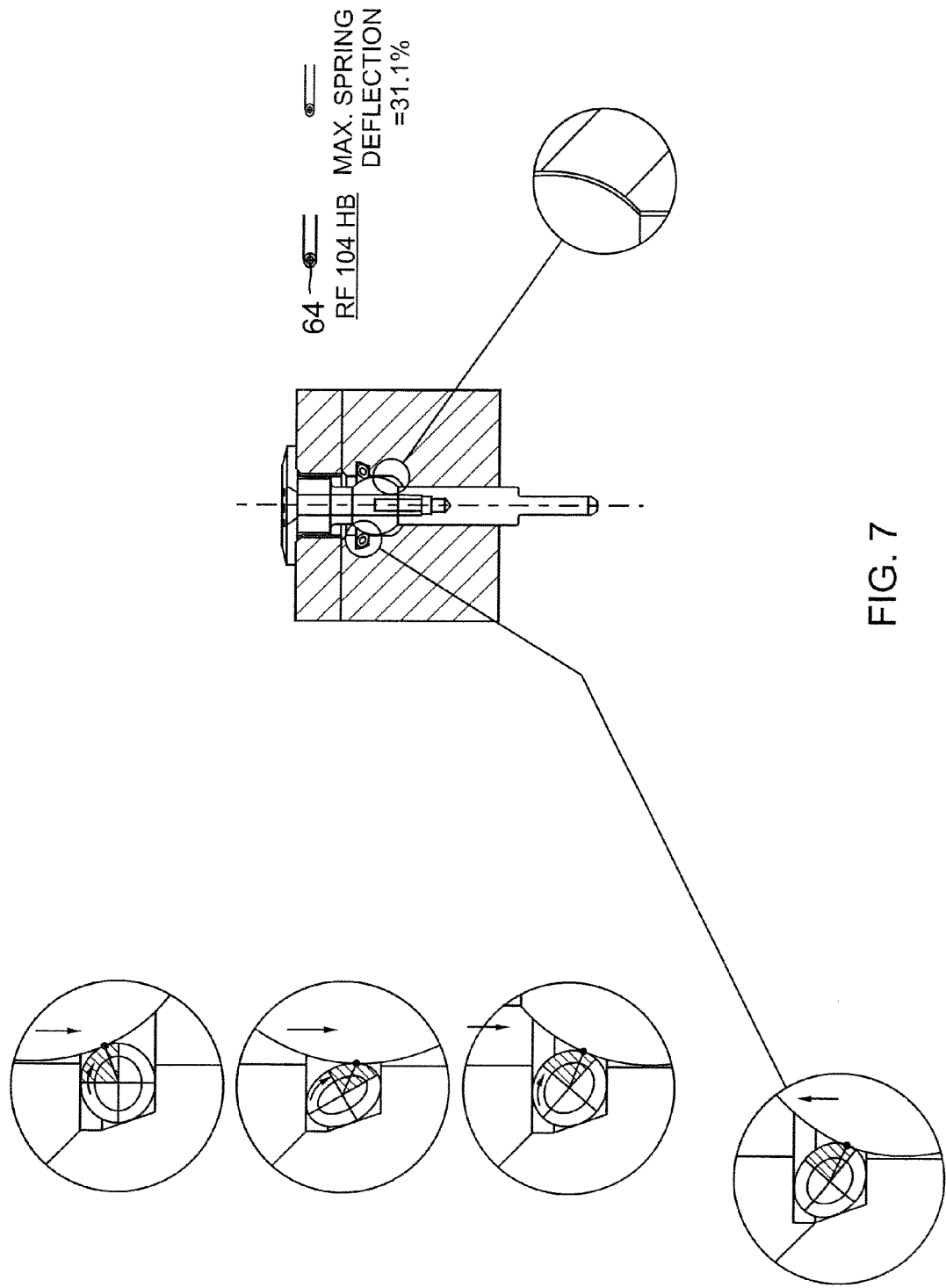
FIG. 7 is a partial cross-sectional side view of another embodiment of the present apparatus, and several detail views.

FIG. 3 illustrates, in partial view, the pin connector 22 at an early stage of installation. The pin connector 22 has been advanced far enough into the bore 24 that the ball portion 44 makes contact with the spring 64 at a small circle of the ball portion 44 distal of its maximum diameter (as measured in a plane perpendicular to the pin connector's longitudinal axis 46). At this stage, the spring minor axis 66 is generally parallel to the bore longitudinal axis 58 (FIG. 2). The spring 64 is undeflected by the ball portion 44, but is deflected as a result of the coil height being greater than the groove 54 width. With reference to FIG. 7, the unstressed height of the coil 64 is 0.087 inch, while the compressed height of the coil 64 in FIG. 3 is 0.079 inch. The light compression of the spring 64 helps to retain the spring 64 within the groove 54 when the pin connector 22 is absent. Those of ordinary skill in the art will appreciate that in certain embodiments of the present pin connector 22, the dimensions of the groove 54 and spring 64 may be such that the groove 54 does not compress the spring 64 in the configuration of FIG. 3.

Figure 4:
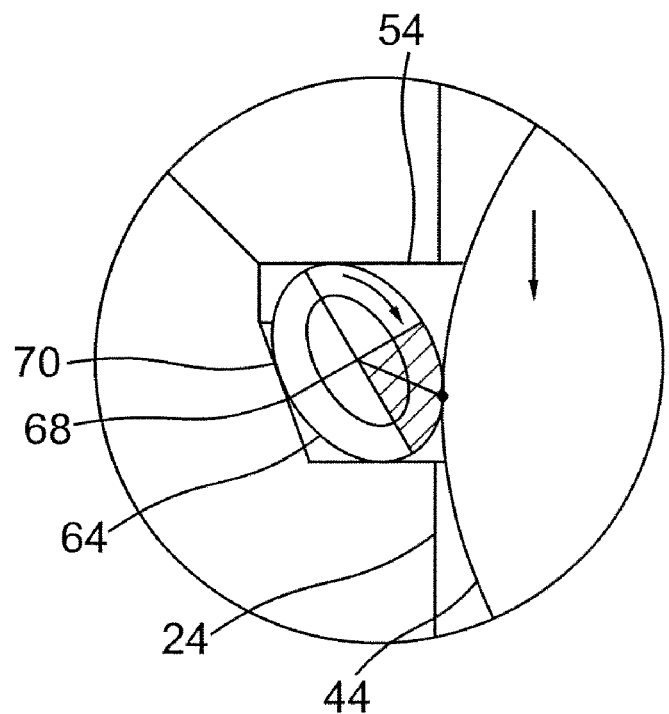
FIG. 4 is a detail view of the groove, spring and ball portion of the apparatus of FIG. 1 at another insertion step.

As the pin connector 22 advances farther into the bore 24, the diameter of the ball portion 44 that contacts the spring 64 increases. Thus, the ball portion 44 deflects and rotates the spring 64 by an increasing amount as the pin connector 22 advances farther into the bore 24. FIG. 4, in partial view, illustrates the configuration of the spring 64 at maximum deflection and rotation, which occurs as the maximum diameter of the ball portion 44 passes a point 68 below the vertical center 70 of the groove 54. The coil has deflected by compressing along its minor axis and has rotated clockwise. Those of ordinary skill in the art will appreciate that in other embodiments the maximum deflection and rotation of the spring 64 will occur at various positions of the ball portion 44 depending upon the relative dimensions of the ball portion 44, the groove 54, and the spring 64. The maximum deflection and rotation of the spring 64 may for example, occur when the maximum diameter of the ball portion 44 is at the groove vertical center 70, above the groove vertical center 70, or below the groove vertical center. The configuration illustrated in FIG. 4 is just one example.

The taper bottom groove 54 facilitates the rotation of the coil 64 as the pin connector is inserted into the bore 24. The taper bottom groove 54 also retards the reverse rotation of the coil 64 as the pin connector 22 is withdrawn from the bore 24. Consequently, greater force is required to remove the pin connector 22 from the bore 24 than is required to insert the pin connector 22 into the bore 24. The magnitude of the difference between the insertion force and the removal force can be adjusted by adjusting the angle of the taper bottom groove 54, which in the illustrated embodiment is 20°. These concepts are described in detail in U.S. Pat. Nos. 4,678,210; 5,082,390; 5,411,348; 5,545,842; 6,749,358; 6,835,084; 7,070,455 and 7,195,523, all of which are expressly incorporated herein by reference.

Figure 5:
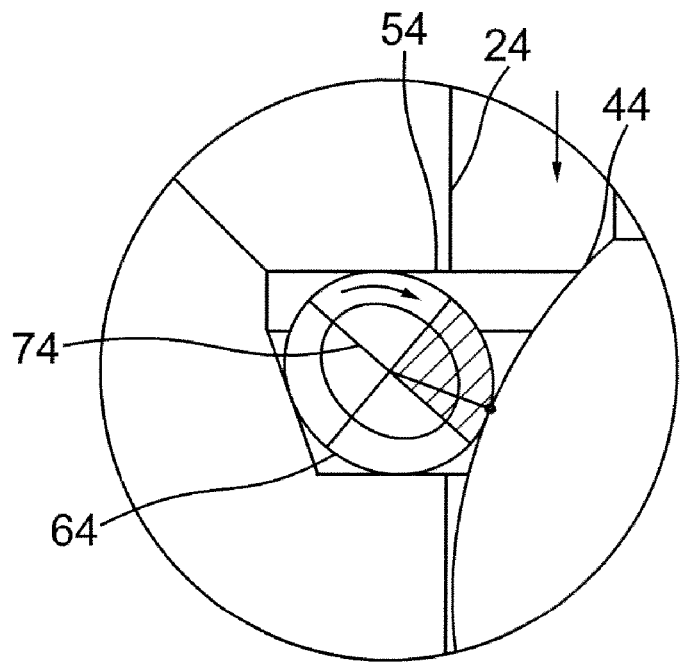
FIG. 5 is a detail view of the groove, spring and ball portion of the apparatus of FIG. 1 at another insertion step.

As the pin connector 22 advances past the configuration of FIG. 4, the diameter of the ball portion 44 that contacts the spring 64 decreases. Thus, the deflection and rotation of the spring 64 decreases as the pin connector 22 advances farther into the bore 24. The pin connector 22 stops advancing when the distal surface of the head portion 22 contacts the plate 26, as shown in FIG. 1. FIG. 5 illustrates the configuration of the spring 64 and the ball portion 44 when the pin connector 22 has stopped advancing. Comparing FIGS. 4 and 5, it is apparent that the deflection of the coil 64 has decreased from FIG. 4 to FIG. 5 and the coil 64 has rotated counterclockwise. As the diameter of the ball portion 44 is smaller at the final contact position shown in FIG. 5, the spring 64 is allowed to expand and concurrently rotates counterclockwise when expanded.

When the pin connector 22 occupies the position illustrated in FIG. 1, the spring 64 is deflected and rotated as shown in FIG. 5. The resilience of the spring 64 creates a spring reaction force $F_S$ that squeezes the ball portion 44. With reference to FIG. 1, the spring force $F_S$ acts in a direction toward the center 72 of the ball portion 44. $F_S$ resolves into a radial component $F_R$ (perpendicular to the shank longitudinal axis 46) and an axial component $F_A$ (parallel to the shank longitudinal axis 46). The axial component $F_A$ retains the pin connector 22 within the bore 24 by counteracting any oppositely directed force that would tend to pull the pin connector 22 out of the bore 24.

Figure 6:
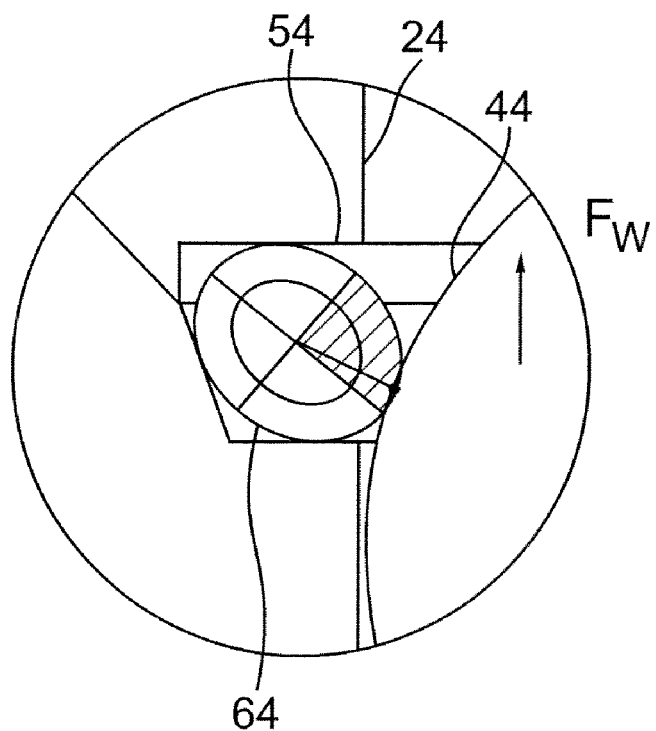
FIG. 6 is a detail view of the groove, spring and ball portion of the apparatus of FIG. 1 at a removal step.

To withdraw the pin connector 22 from the bore 24, a withdrawal force $F_W$ is applied to the pin connector 22 as shown in FIG. 6. $F_W$ acts in a direction opposite $F_A$, and must be greater than $F_A$ in order for the pin connector 22 to begin to withdraw from the bore 24. However, as the pin connector 22 is pulled out of the bore 24 the squeezing force of the spring 64 on the ball portion 44, and thus the axial component $F_A$, increases as the diameter of the ball portion 44 in contact with the spring 64 increases. Further, the taper bottom groove 54 resists spring rotation in the direction necessary to withdraw the pin (counterclockwise in FIG. 6). Thus, $F_W$ must overcome the axial component to withdraw the pin connector 22 from the bore 24. The increasing magnitude of $F_A$ and the resistance to spring rotation provided by the taper bottom groove 54 provide a secure hold on the pin connector 22. Hence, an aspect of the present embodiments is a method for retaining a first member to a second member by requiring an incrementally increasing force to remove a pin from a bore that holds the two members together, the force increasing to a maximum value when the spring contacts the ball portion along a maximum diameter measured at a plane perpendicular to the longitudinal axis of the pin. The invention is also understood to include a fastening assembly that requires an insertion force applied to a pin connector to deflect a spring from a first deflection to a maximum deflection and then drop to a value between the first deflection and the maximum deflection when the pin connector is attached to a housing. For the method and the assembly, the pin connector comprises a shank and an enlarged ball joint disposed along a length of the shank. In yet another example, the shank does not incorporate threads or at least threads proximal of the enlarged ball joint.

The magnitude of the forces $F_S$, $F_R$, $F_A$, $F_W$ depends upon many factors, including the spring constant, the relative dimensions of the spring 64 and the groove 54, the relative dimensions of the spring 64 and the ball portion 44, the distance that the pin connector 22 advances into the bore 24 (which is influenced by the thickness of the plate 26, among other factors), the wire diameter of the spring 64, and other factors. These factors are selected to provide a desired range for $F_W$ for each application. For example, when the groove 54 width is greater than the coil height, the spring 64 exerts less force on the pin connector 22 because there is free space within the groove 54 into which the spring 64 may deform. Conversely, when the groove 54 width is less than the coil height, the spring 64 exerts greater force on the pin connector 22 because there is no free space within the groove 54 into which spring 64 may deform. Thus, if more holding power is desired for a given application, the groove 54 width may be selected to be less than the coil height.

$F_W$ is also influenced by the location of the contact point between the spring 64 and the ball portion 44. With reference to FIG. 5, the contact point is located 20° from the major axis 74 of the coil 64. As the magnitude of this angle increases (as the contact point moves farther from the major axis 74), the magnitude of $F_W$ decreases. Conversely, as the magnitude of this angle decreases (as the contact point moves closer to the major axis 74), the magnitude of $F_W$ increases. The taper bottom groove 54 causes this effect, which is explained in detail in U.S. Pat. Nos. 4,678,210; 5,082,390; 5,411,348; 5,545,842; 6,749,358; 6,835,084; 7,070,455 and 7,195,523, all of which are expressly incorporated herein by reference.

Embodiments of the present pin connector 22 advantageously provide the flexibility to tolerate variations in thickness in either or both of the first and second members 26, 28. The pin connector 22 provides a force tending to hold the first and second members 26, 28 together (a retaining force) as long as the spring 64 contacts the ball portion 44 and the spring 64 is located proximally of the maximum diameter of the ball portion 44. Thus, for example, in the configuration illustrated in FIG. 1 the pin connector 22 can retain the plate 26 on the housing 28 even if the plate 26 varies in thickness. If the plate 26 is thinner than expected, then the pin connector 22 simply extends farther into the bore 24, and if the plate 26 is thicker than expected then the pin connector 22 does not extend as far into the bore 24. Again, as long as the spring 64 contacts the ball portion 44 proximally of the maximum diameter of the ball portion 44 then the pin connector 22 provides a retaining force. Said differently, the spring 64 has a range of deflection whereby a sufficient spring force is generated to sufficiently grip the ball portion 44 to retain the pin connector 22 within the bore. The range of deflection encompasses thickness variations of either the first member 26, the second member 28, or both. Thus, an aspect of the present invention is understood to include an assembly for connecting a first member to a second member by incorporating a groove in the second member, which is located further away from a head portion on a pin connector than the first member. In one particular example, variation in the thickness of the first member and/or the thickness of the second member from a set or first predetermined value changes the location at which a spring is deflected by a ball joint. A method is also understood to be provided by using the assembly to fasten a first member to a second member in which a step is included that requires deflecting a spring with a ball joint located on a shank of a connector pin.

Embodiments of the present pin connector advantageously provide the ability to quickly connect objects that are to be secured together and to disconnect the same objects. Again referring to the example of FIG. 1, to secure the plate 26 to the housing 28 one simply aligns the bores 24 in each member 26, 28 and inserts the pin connector 22 by applying a distally directed axial force to the pin connector 22. The axial force may be applied with digital pressure, or, for applications requiring a strong retaining force, with a rubber mallet, for example. There is no need to rotate the pin connector 22 relative to the bore 24 as with a threaded fastener. The insertion process is thus much faster as compared to using a threaded fastener. To remove the pin connector 22 from the bore 24, one applies a proximally directed axial force to the pin connector 22, as by prying the head away from the plate 26 with a flathead screwdriver. Once the maximum diameter of the ball portion 44 clears the spring 64 the pin connector 22 pops right out of the bore 24 due to the squeezing force applied to the ball portion 44 by the spring 64. Again, there is no need for time consuming rotation of the connector. To assist in removing the pin connector 22 from the bore 24, the head portion 22 may include surface features (not shown) that engage a pulling tool, such as a pin handle or an undercut designed for gripping. Thus, a further feature of the present invention is understood to include a method for securing a first member to a second member by inserting a connector pin into a bore of the first member and the second member without rotating the pin for engagement. Engagement is instead provided by deflecting a spring during the insertion step. In a specific embodiment, the spring exerts a force on a ball joint located on the shank of the connector pin to provide a gripping force on the connector pin.

The quick connect/disconnect feature of the present embodiments is particularly advantageous in applications where many connectors are required to secure two members together. This feature is also advantageous in tight spaces where there is little room in which to manipulate the tools necessary to rotate threaded fasteners.

The above description presents the best mode contemplated for carrying out the present apparatus for securing a first member and a second member to one another, and of the manner and process of making and using it, in such full, clear, concise, and exact terms as to enable any person skilled in the art to which it pertains to make and use this apparatus and practice its associated methods. The present apparatus and methods are, however, susceptible to modifications and alternate constructions from that discussed above that are fully equivalent. For example, while the pin connector and at least one of the first member and the second member are contemplated to be made from a metal material, such as steel or a steel alloy, they may be made from engineered plastic. Consequently, the present apparatus and methods are not limited to the particular embodiments disclosed. On the contrary, the present apparatus and methods cover all modifications and alternate constructions coming within the spirit and scope of the apparatus and methods as generally expressed by the following claims, which particularly point out and distinctly claim the subject matter of the apparatus and methods.

What is claimed is:

1. Apparatus for securing a first member and a second member to one another, the first and second members including a bore extending through at least one of the first and second members and at least partially through the other of the first and second members, the apparatus comprising:
    a pin connector including
        a head portion having a first diameter;
        an elongate shank extending from the head portion, the shank having at least a first portion with a second diameter that is less than the first diameter; and
        an enlarged ball portion positioned along the shank, the ball portion being shaped substantially as a double-truncated sphere and having a third diameter that is less than the first diameter but greater than the second diameter;
    an annular groove in the second member, the annular groove extending around the bore; and
    a canted coil spring disposed within the groove;
    wherein the apparatus is configured such that the spring exerts a squeezing force on the ball portion when the pin connector is disposed within the bore.

2. The apparatus of claim 1, wherein the shank includes a proximal portion and a distal portion.

3. The apparatus of claim 2, wherein the proximal and distal portions have different diameters.

4. The apparatus of claim 1, wherein a center of the ball portion lies on a longitudinal axis of the shank, such that the ball portion protrudes evenly from all sides of the shank.

5. The apparatus of claim 1, wherein a distal end of the shank includes a chamfer.

6. The apparatus of claim 1, wherein the shank is unthreaded.

7. The apparatus of claim 1, wherein the elongate shank has a second diameter proximal of the enlarged ball portion.

8. The apparatus of claim 1, wherein the bore extends through the second member.

9. A method for securing a first member to a second member, said method comprising:
    inserting a pin comprising a shaft, a pin head, and a ball section disposed distally of the pin head and along the shaft into a bore of a first member and a bore of a second member, said second member comprising a groove located in said bore and a canted coil spring positioned therein;
    deflecting the canted coil spring from a first deflection, to a second deflection, and to a third deflection as the ball section comes in contact with the spring and moves to a final rest position;
    wherein said third deflection is less than said second deflection.

10. The method of claim 9, wherein the shaft is unthreaded.

11. The method of claim 9, wherein the canted coil spring is a radial canted coil spring.

12. The method of claim 9, further comprising a chamfer surface located at a distal end of the shaft.

13. The method of claim 9, wherein the bore of the first member and the bore of the second member align to form a common bore.

14. The method of claim 9, wherein the first member has a thickness and the second member has a thickness and wherein the thickness of the second member is larger than the thickness of the first member.

15. The method of claim 9, wherein the groove comprises a tapered bottom surface.

16. The method of claim 9, wherein the pin head contacts the first member when the ball section is in the final rest position.

17. An apparatus for securing a first member and a second member to one another, wherein the first member has a bore and the second member has a bore; an annular groove comprising two side walls and a bottom wall disposed therebetween is located in the bore of the second member, which is located further away from a head portion on a pin connector than the first member; and wherein an enlarged portion is located on a shank of the pin connector away from the head potion and away from the bottom wall.

18. The apparatus of claim 17, wherein the pin connector is unthreaded.

19. The apparatus of claim 17, wherein the bottom wall of the annular groove is tapered relative to at least one of the two side walls.

20. The apparatus of claim 17, wherein a spring is located in the annular groove.

* * * * *

UNITED STATES PATENT AND TRADEMARK OFFICE
CERTIFICATE OF CORRECTION

PATENT NO.        : 8,196,271 B2                                        Page 1 of 1
APPLICATION NO.   : 12/559227
DATED             : June 12, 2012
INVENTOR(S)       : Pete Balsells It is certified that error appears in the above-identified patent and that said Letters Patent is hereby corrected as shown below:

In column 2, line 19, delete "apparatus:" and insert -- apparatus; --, therefor.

In column 2, line 27, delete "step:" and insert -- step; --, therefor.

In column 2, line 29, delete "step:" and insert -- step; --, therefor.

In column 4, line 49, delete "64 may" and insert -- 64 may, --, therefor.

In column 8, line 58, in Claim 17, delete "potion" and insert -- portion --, therefor.

Signed and Sealed this
Eleventh Day of December, 2012

David J. Kappos
*Director of the United States Patent and Trademark Office*